United States Patent
Lu et al.

(10) Patent No.: US 9,538,427 B2
(45) Date of Patent: Jan. 3, 2017

(54) METHOD FOR DETERMINING MOBILE STATE OF MOBILE TERMINAL AND ADJUSTING TIME TO TRIGGER

(71) Applicant: FUJITSU LIMITED, Kawasaki, Kanagawa (JP)

(72) Inventors: Yanling Lu, Beijing (CN); Haibo Xu, Beijing (CN); Weiwei Wang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 170 days.

(21) Appl. No.: 14/162,513

(22) Filed: Jan. 23, 2014

(65) Prior Publication Data
US 2014/0135057 A1    May 15, 2014

Related U.S. Application Data

(63) Continuation of application No. PCT/CN2011/077805, filed on Jul. 29, 2011.

(51) Int. Cl.
*H04W 36/00* (2009.01)
*H04W 36/32* (2009.01)
*H04W 36/24* (2009.01)

(52) U.S. Cl.
CPC ......... *H04W 36/0016* (2013.01); *H04W 36/32* (2013.01); *H04W 36/245* (2013.01)

(58) Field of Classification Search
CPC .. H04W 36/0083; H04W 36/30; H04W 8/005; H04W 36/0061; H04W 48/20; H04W 17/00; H04W 17/309; H04W 17/345; H04W 7/0417

(Continued)

(56) References Cited

U.S. PATENT DOCUMENTS

2009/0190555 A1* 7/2009 Oguchi ................. H04W 8/005
                                                              370/331
2009/0323638 A1    12/2009 Catovic et al.
(Continued)

FOREIGN PATENT DOCUMENTS

CN        1867176 A      11/2006
CN        101841835      9/2010
(Continued)

OTHER PUBLICATIONS

International search report issued for corresponding international application No. PCT/CN2011/077805, mailed May 3, 2012.
(Continued)

*Primary Examiner* — Shaima Q Aminzay
(74) *Attorney, Agent, or Firm* — Myers Wolin, LLC

(57) ABSTRACT

The present invention relates to a base station, and a method for determining a mobile state of a mobile terminal and adjusting TTT. A method for determining a mobile state of a mobile terminal, applied in a base station and includes: setting a handover count period and a current handover count value; determining whether the handover count period has elapsed; determining whether the mobile terminal is handed over; transmitting information of the handover count period, the current handover count value and information of a size of a cell where the base station is located to a base station serving as a handover destination cell, in case the handover count period has not elapsed and the mobile terminal is handed over.

15 Claims, 11 Drawing Sheets

(58) Field of Classification Search
USPC ............... 455/436, 438, 439, 440, 441, 442, 443,455/432.1, 501, 452.2, 426.1, 435.1; 370/242, 370/254, 331, 332, 337
See application file for complete search history.

(56) References Cited

U.S. PATENT DOCUMENTS

2010/0113019 A1   5/2010  Jeong et al.
2012/0289233 A1*  11/2012 Medbo .................. H04W 36/32
                                                       455/436

FOREIGN PATENT DOCUMENTS

| CN | 101854684 A | 10/2010 |
| CN | 101925148 A | 12/2010 |
| CN | 101998563   | 3/2011  |
| CN | 102077646 A | 5/2011  |
| EP | 2094045     | 8/2009  |

OTHER PUBLICATIONS

3GPP TS 36.304 V10.2.0; 3rd Generation Partnership Project; Technical Specification Group Radio Access Network; Evolved Universal Terrestrial Radio Access (E-UTRA); "User Equipment (UE) procedures in idle mode (Release 10)"; Jun. 2011.
Alcatel-Lucent Shanghai Bell, Alcatel-Lucent; "Discussion on mobility estimation for HetNet"; Agenda Item: 7.6; 3GPP TSG-RAN WG2 Meeting #74; R2-113181; Barcelona, Spain; May 9-13, 2011.
First Office Action and search report issued on Aug. 18, 2016 for counterpart Chinese patent application No. 201180071958.4 with an English translation.

* cited by examiner

METHOD FOR DETERMINING MOBILE STATE OF MOBILE TERMINAL AND ADJUSTING TIME TO TRIGGER

CROSS-REFERENCE TO RELATED APPLICATIONS

This is a continuation of International Application No. PCT/CN2011/077805, filed on Jul. 29, 2011, now pending, the contents of which are herein wholly incorporated by reference.

TECHNICAL FIELD

The present invention relates to a communication system, and particularly, to a method and an apparatus for acquiring a mobile state of a mobile terminal in the communication system.

BACKGROUND

In a wireless mobile communication system, in order to ensure continuous communications of a mobile terminal, the mobile terminal shall be handed over under a connected state. In order to correctly trigger the handover, the mobile terminal shall perform a Radio Resource Management (RRM) measurement. If results of the measurement always meet a certain condition (i.e., a triggering condition, also referred to as a triggering event) within a specified period (Time to Trigger, TTT), the mobile terminal reports the results of the measurement to a base station, and the base station can decide whether to start a handover process according to the results of the measurement.

FIG. 1 illustrates a schematic diagram in which a mobile terminal reports the TTT to a base station based on an RRM measurement. As illustrated in FIG. 1, if the triggering condition/event is defined as "the signal quality of the current serving cell is lower than a certain threshold within the TTT", the mobile terminal reports the results of the measurement to the base station only when values of the measurement are always lower than the threshold in the TTT.

In this process, the TTT and the triggering condition/event can both influence success rate of the handover. For example, in a case where the triggering condition/event is "the signal quality of the current serving cell is lower than a certain threshold", the serving cell requires extra time from obtaining a measurement report to triggering and performing the handover, thus when the threshold is too low, there may be a situation that although the mobile terminal has reported the result of the measurement, the signal quality of the current serving cell quickly deteriorates, the subsequent actions such as triggering the handover cannot be performed, and a call drop will occur at the mobile terminal. When the threshold is too high, there may be a situation that the signal quality of the current serving cell still can maintain the communication with the mobile terminal, while the signal quality of the destination cell is not good enough, and a call drop will also occur at the mobile terminal. Meanwhile, the TTT can influence effect of the handover. When the TTT is too long, an extra deterioration of the signal quality of the serving cell may appear, the signal quality of the serving cell is not enough to support a subsequent handover operation, and a call drop will occur. When the TTT is too short, the signal quality of the serving cell may fluctuate momentarily, and the signal quality can be recovered quickly. In that case, the mobile terminal is handed over from the current serving cell, while the signal quality of the destination cell is not good enough, thus a call drop will easily occur at the mobile terminal.

The setting of the TTT is related to multiple conditions such as a channel static change situation and speed of a mobile terminal. The channel static change situation is the quality change situation of the channel between the mobile terminal and the base station when the mobile terminal is static: if the channel quality fluctuates in a large range, generally the TTT shall be set to be relatively long to smooth a large channel fluctuation; whereas if the channel quality fluctuates in a small range, the TTT may be set to be relatively short. When speed of the mobile terminal is considered, the TTT shall be short if the speed of the mobile terminal is high, so as to prevent the channel quality from quickly varying with the user position, whereas if the speed of the mobile terminal is low, the TTT shall be long.

Since it is difficult to judge the channel static change situation, in an existing network, the TTT is set by the operator according to a general situation, and the TTT is corrected by the mobile terminal according to its own mobile state: the mobile state is substantially judged by counting the number of handovers within a specified time (the speed increases with the number). From the mobile state, corresponding correcting factor can be searched and then multiplied by the original TTT. The correcting factor is generally less than 1, and it decreases when the speed rises. The process for the mobile terminal to correct the TTT is as follows:

Step 1: the base station triggers the mobile terminal to detect the mobile state. The base station transmits parameters required for the TTT to the mobile terminal: a handover count period, an additional handover count period, an upper threshold, an intermediate threshold, a high-speed correction value and an intermediate-speed correction value.

Step 2: the mobile terminal counts the number of handovers within the handover count period. When the handover count period expires, if result of the counting is larger than the upper threshold, the mobile terminal judges that it enters a high-speed mobile state; if result of the counting is between the upper threshold and the intermediate threshold, the mobile terminal judges that it enters an intermediate-speed mobile state; and if neither the high-speed mobile state nor the intermediate-speed mobile state is detected when the additional handover count period expires, the mobile terminal judges that it enters a normal mobile state. Meanwhile, if the mobile terminal is subsequently handed over back to a cell after being handed over out of the cell (i.e., a ping-pong effect), the continuous handover between the two identical cells is not counted.

Step 3: if the mobile terminal is in the high-speed mobile state, it corrects the TTT using the high-speed correction value; if the mobile terminal is in the intermediate-speed mobile state, it corrects the TTT using the intermediate-speed correction value; and if the mobile terminal is in the normal mobile state, it does not need to correct the TTT.

The above mechanism has an obvious problem: the mobile terminal does not consider a cell size when counting the number of handovers. FIG. 2 illustrates a schematic diagram of an influence of a cell size on the counted number of handovers. As illustrated in FIG. 2, the mobile terminal moves through paths 1 and 2 in the same speed respectively. When the mobile terminal moves through path 1, since a radius of the cell passed through is larger, the number of handovers is obviously smaller than that when the mobile terminal moves through path 2. Thus, different mobile states may be obtained when the mobile terminal moves in two paths.

In order to overcome the above problem, multiple mechanisms are optional at present.

Mechanism 1: the base station notifies its size to all mobile terminals in a cell where the base station is located. Thus the mobile terminal can acquire the cell size of the handover, and correct the number of handovers to obtain a more accurate mobile state. This method is a direct improvement to the prior mechanism and it still depends on the handover counting by the mobile terminal.

Mechanism 2: the base station corrects parameters (e.g., the upper threshold) related to the counting according to environment of the mobile terminal. For example, when the mobile terminal moves from an area of a large cell radius to an area of a small cell radius, the base station can configure a large upper threshold for the mobile terminal. Thus the mobile terminal considers the cell size when judging the mobile state. Obviously, the method still depends on the handover counting by the mobile terminal.

Mechanism 3: an actual speed value is measured through a speed detection algorithm rather than the handover counting. For example, the mobile terminal having a speed detection capability can acquire its actual speed through a device such as GPS. The mechanism depends on the capability of the mobile terminal, but not any mobile terminal has such the capability in the actual system.

Therefore, the measurement of the mobile state of the mobile terminal (i.e., the moving speed) in the relevant art is mainly performed by the mobile terminal itself, or it requires the mobile terminal itself to have the speed detection capability, or it requires a complex counting operation. As a result, the complexity of the mobile terminal is increased.

To be noted, the above introduction to the technical background is just made for the convenience of clearly and completely describing the technical solutions of the present invention, and to facilitate the understanding by a person skilled in the art. It shall not be deemed that the above technical solution is known to a person skilled in the art just because it has been illustrated in the Background section of the present invention.

[Non-patent literature 1]: 3GPP TS 36.331 V10.1.0 (2011-3), Radio Resource Control (RRC) specification. (Release 10);

[Non-patent literature 2]: R2-113181, Discussion on mobility estimation for HTN, Alcatel-Lucent, Alcatel-Lucent Shanghai Bell;

[Non-patent literature 3]: 3GPP TS 36.304 V10.2.0 (2011-06), User Equipment (UE) procedure in idle mode (Release 10).

SUMMARY

The present invention is proposed in view of the above defects of the relevant art, so as to solve one or more problems caused by the limitation and shortages of the relevant art, and provide at least one beneficial selection.

In order to achieve the above objective, according to an aspect of the present invention, a method for determining a mobile state of a mobile terminal, applied in a base station is provided, including: setting a handover count period and a current handover count value; determining whether the handover count period has elapsed; determining whether the mobile terminal is handed over; and transmitting information of the handover count period, the current handover count value and information of a size of a cell where the base station is located to a base station serving as a handover destination cell, in case the handover count period has not elapsed and the mobile terminal is handed over.

According to another aspect of the present invention, a method for adjusting TTT is provided, including: receiving a TTT correcting factor; and adjusting the TTT according to the TTT correcting factor.

According to another aspect of the present invention, a method for adjusting TTT is provided, including: receiving a handover count value; determining a TTT correcting factor according to the handover count value; and adjusting the TTT according to the determined TTT correcting factor.

According to another aspect of the present invention, a base station is provided, including: a count setting unit configured to set a handover count period and a current handover count value; a first determining unit configured to determine whether the handover count period has elapsed; a second determining unit configured to determine whether the mobile terminal is handed over; and a transmitting unit configured to transmit information of the handover count period, the current handover count value and information of a size of a cell where the base station is located to a base station serving as a handover destination cell, in case the handover count period has not elapsed and the mobile terminal is handed over.

According to another aspect of the present invention, a logic part readable program is provided, which when being executed by a logic part of a base station, enables the base station to implement the method of the present invention, or enables the logic part to serve as corresponding part of the base station according to the present invention.

According to another aspect of the present invention, a logic part readable tangible storage medium is provided, which stores the aforementioned logic part readable program.

BRIEF DESCRIPTION OF THE DRAWINGS

The above and other objectives, features and advantages of the present invention will be more easily understood from the following descriptions of the embodiments of the present invention given with reference to the drawings. The parts in the drawings are not necessarily drafted to scale, but just for illustrating the principle of the present invention. For the convenience of illustrating and describing some portions of the present invention, corresponding portions in the drawings may be enlarged, i.e., enlarged with respect to other parts in an exemplary apparatus practically manufactured according to the present invention. In the drawings, identical or corresponding technical features or parts are denoted with identical or corresponding reference signs.

DESCRIPTION OF THE EMBODIMENTS

Figure 1:
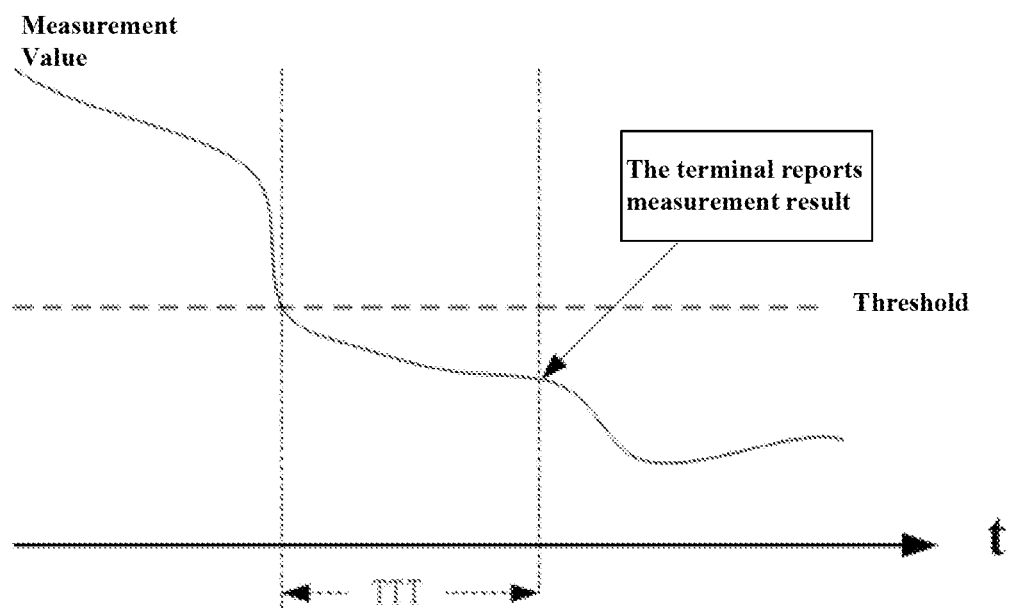
FIG. 1 illustrates a schematic diagram in which a mobile terminal reports TTT to a base station based on an RRM measurement.
Figure 2:
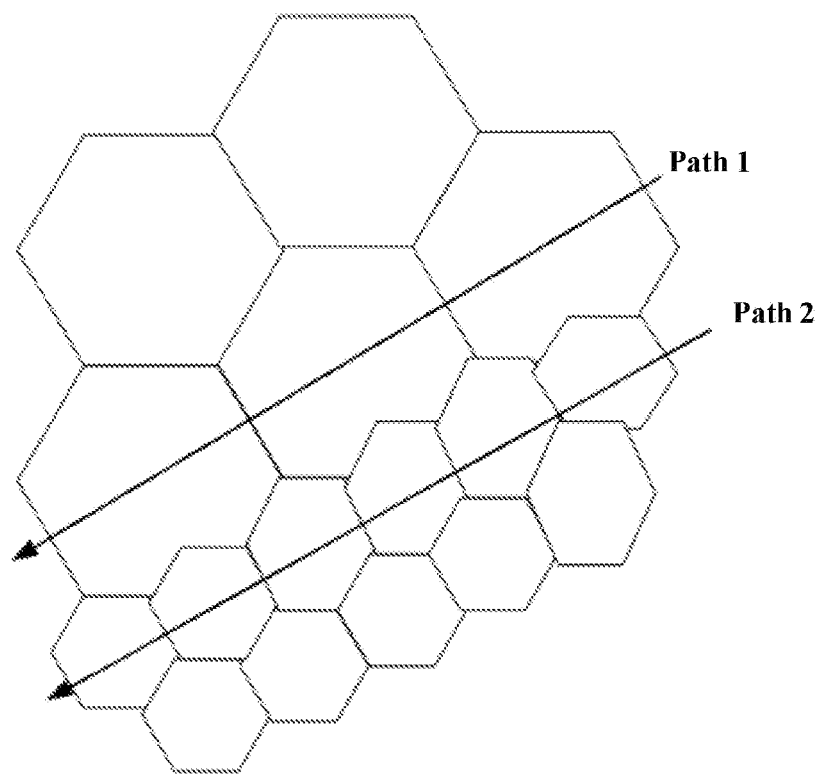
FIG. 2 illustrates a schematic diagram of an influence of a cell size on the counted number of handovers.

The embodiments of the present invention will be described as follows with reference to the drawings. Elements and features described in a drawing or an embodiment of the present invention can be combined with elements and features illustrated in one or more other drawings or embodiments. To be noted, for the purpose of clearness, representations and descriptions of parts and processing unrelated to the present invention and known to a person skilled in the art are omitted in the drawings and the Description.

The Description and the drawings specifically disclose the specific embodiments of the present invention, and designate the ways in which the principle of the present invention can be adopted. It shall be appreciated that the scope of the present invention is not limited thereto. The present invention includes many changes, amendments and equivalents within the scope of the spirit and clauses of the accompanied claims.

To be emphasized, the term "comprise/include/have" used herein specifies the presence of feature, element, step or component, not excluding the presence or addition of one or more other features, elements, steps or components.

Figure 3:
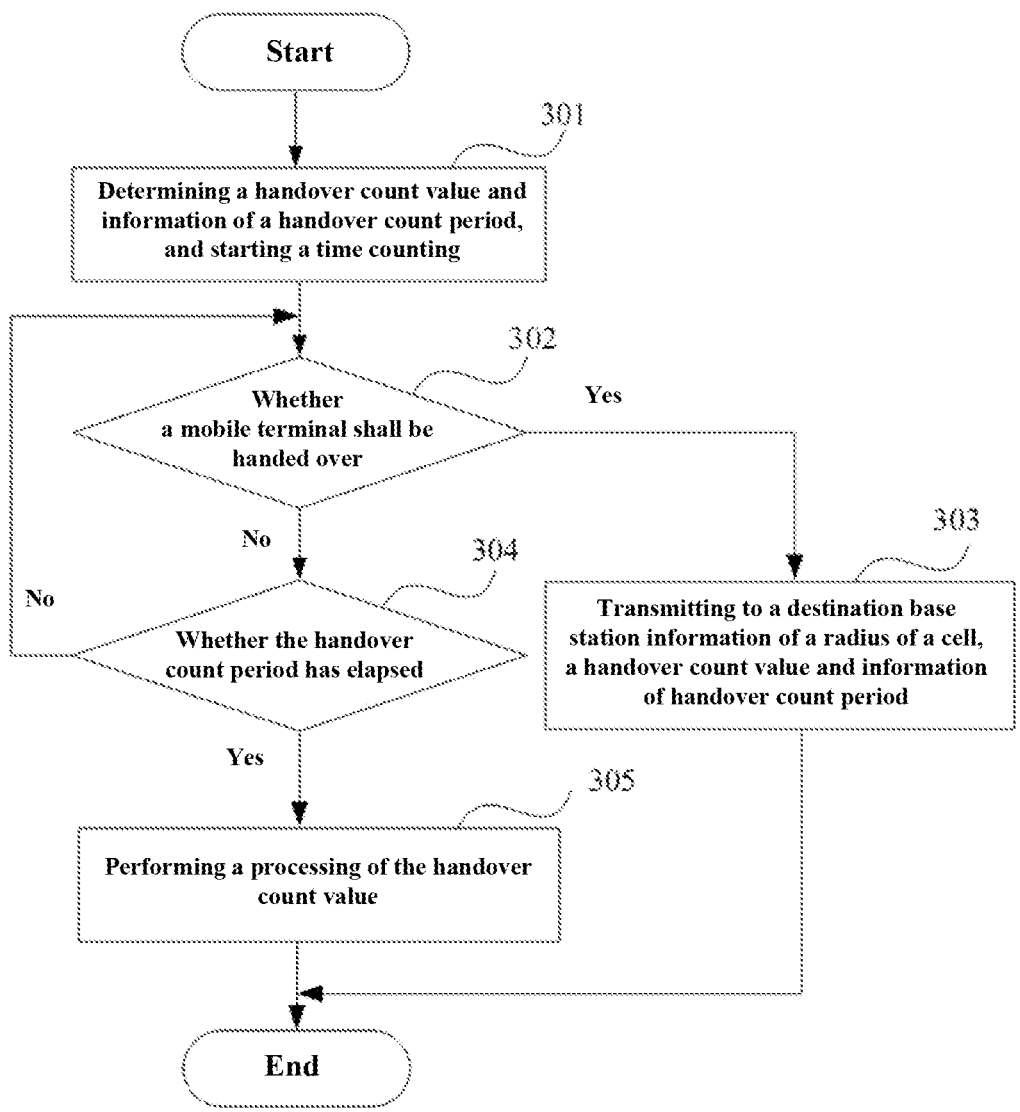
FIG. 3 illustrates a schematic flowchart of a method for determining a mobile state of a mobile terminal according to an embodiment of the present invention.

FIG. 3 illustrates a schematic flowchart of a method for determining a mobile state of a mobile terminal according to an embodiment of the present invention.

The method illustrated in FIG. 3 is carried out in a base station. As illustrated in FIG. 3, firstly in step 301, the base station determines a current handover count value and a handover count period, and starts a time counting. When the base station performing the method is a base station deciding to start a detection of a mobile state of a mobile terminal (also referred to as initial base station), the base station decides to start the detection of the mobile state of the mobile terminal, determines the initial values of the handover count period and a handover count value by itself, and takes the initial value of the handover count value as the current handover count value. The handover count period is duration of handover counting. The information indicating the handover count period (information of the handover count period) may be count start time and a counting duration, or may be count end time. When the base station is a base station to which the mobile terminal is handed over (also referred to as subsequent base station) after starting the detection of the mobile state of the mobile terminal, rather than a base station deciding to start the detection of the mobile state of the mobile terminal, the base station determines its handover count period according to the information of the handover count period received from a previous base station, and determines the current handover count value according to the received handover count value and information of a radius of a cell where the previous base station is located transmitted by the previous base station. The handover count value may be updated in the following equation.

$$\mathrm{Num\_}h(n) = \mathrm{Num\_}h(n-1) + r(n),$$

where, Num_h(n) indicates the handover count value after n handovers; r(n) indicates a progressive value positively related to a cell size/radius of the nth handover; it shall be reflected that r(n) increases with the increase of the radius (at least r(n) cannot decrease with the increase of the radius), and n is an integer larger than or equal to 1; Num_h(0) is the initial handover count value. Herein the "previous base station" refers to the base station serving the mobile terminal before handover.

Next, in step 302, it is judged whether the mobile terminal shall be handed over. If it is judged that the mobile terminal shall be handed over (step 302, Yes), transmitting to a destination base station (i.e., a base station serving the mobile terminal after handover), in step 303, information of the radius of the cell where the base station is located, the current handover count value and information of the handover count period, and ending the processing.

If it is judged in step 302 that the mobile terminal shall not be handed over (step 302, No), judging, in step 304, whether the handover count period has elapsed. For example, when the information of the handover count period is the count end time, judging whether the current time reaches the count end time. When the information of the handover count period is the count start time and the counting duration, it is judged whether a difference between the current time and the count start time reaches the counting duration. If the handover count period has not elapsed (step 304, No), the process returns to step 302 to continue to judge whether the mobile terminal shall be handed over. If it is judged in step 304 that the handover count period has elapsed (step 304, Yes), performing a processing based on the handover count value in step 305 (also referred to as post-processing).

To be noted, the orders of steps 302 and 304 may be exchanged, i.e., the base station may firstly perform step 304 to judge whether the handover count period has elapsed; if yes, performing step 305, otherwise performing step 302 to judge whether the mobile terminal shall be handed over. If the mobile terminal shall be handed over, performing step 303, otherwise returning to step 304.

In another embodiment, if the base station is a subsequent base station, a ping-pong effect shall also be considered when the handover count value is determined in step 301.

The ping-pong effect may be construed as a continuous handover between two cells, such as cell b→cell c→cell b→cell c, or cell b→cell c→cell b, etc. In one embodiment, after finding the ping-pong effect, the base station for example does not count the handovers between two identical cells where the ping-pong effect occurs. Thus Num_h(n) may be equal to Num_h(n−2) or Num_h earlier obtained by the mobile terminal. For example, if the mobile terminal is handed over from cell a to cell b in the n−4$^{th}$ handover, a ping-pong effect occurs between cells b and c, and the mobile terminal is finally handed over to cell d. The handover order is a→b→c→b→c→d, and the base station of cell d can judge that a ping-pong effect occurs in the mobile terminal after the n$^{th}$ handover (a handover from cell c to cell d). In that case, Num_h(n)=Num_h(n−4)+r(n), i.e., Num_h(n)=Num_h(n−1)−r(n−1)−r(n−2)−r(n−3)+r(n). In another embodiment, after finding the ping-pong effect, the base station for example only counts once for the handovers between two identical cells wherein the ping-pong effect occurs. In that case, for example if the mobile terminal is handed over from cell a to cell b in the n−4$^{th}$ handover, a ping-pong effect occurs between cells b and c, and the mobile terminal is finally handed over to cell d. The handover order is a→b→c→b→c→d, and the base station of cell d can judge that a ping-pong effect occurs in the mobile terminal after the n$^{th}$ handover (a handover from cell c to cell d). In that case, Num_h(n)=Num_h(n−3)+r(n)=Num_h(n−1)−r(n−1)−r(n−2)+r(n).

In an embodiment where the subsequent base station shall consider the ping-pong effect, a list of r values, which is obtained by the mobile terminal from a cell most recently serving after the handover counting is started, to a base station serving as the handover destination in step 303, for example, r values corresponding to a predetermined number (e.g., 16) of cells most recently serving the mobile terminal. Thus in step 301, the subsequent base station serving as the handover destination may determine the calculation of Num_h(n) according to the judgment result of the ping-pong effect. For example, when it is judged that a ping-pong effect occurs, the handover count value is calculated according to the received r value corresponding to the base station where the ping-pong effect occurs. In another embodiment, the handover count values corresponding to the most recently predetermined number of handovers, such as Num(n−4), Num(n−3), Num(n−2) and Num(n−1) may be transmitted. Thus in step 301, the subsequent base station serving as the handover destination may determine the calculation of Num_h(n) according to the judgment result of the ping-pong effect. For example, when it is judged that a ping-pong effect occurs, the current handover count value is calculated using appropriate previous count value according to the base station where the ping-pong effect occurs.

In the existing system, the base station can judge the ping-pong effect. For example, in the existed system, the base station can obtain a list of 16 cells most recently serving the mobile terminal through the network side. From the list, the base station can judge whether a ping-pong effect occurs in corresponding mobile terminal.

Figure 4:
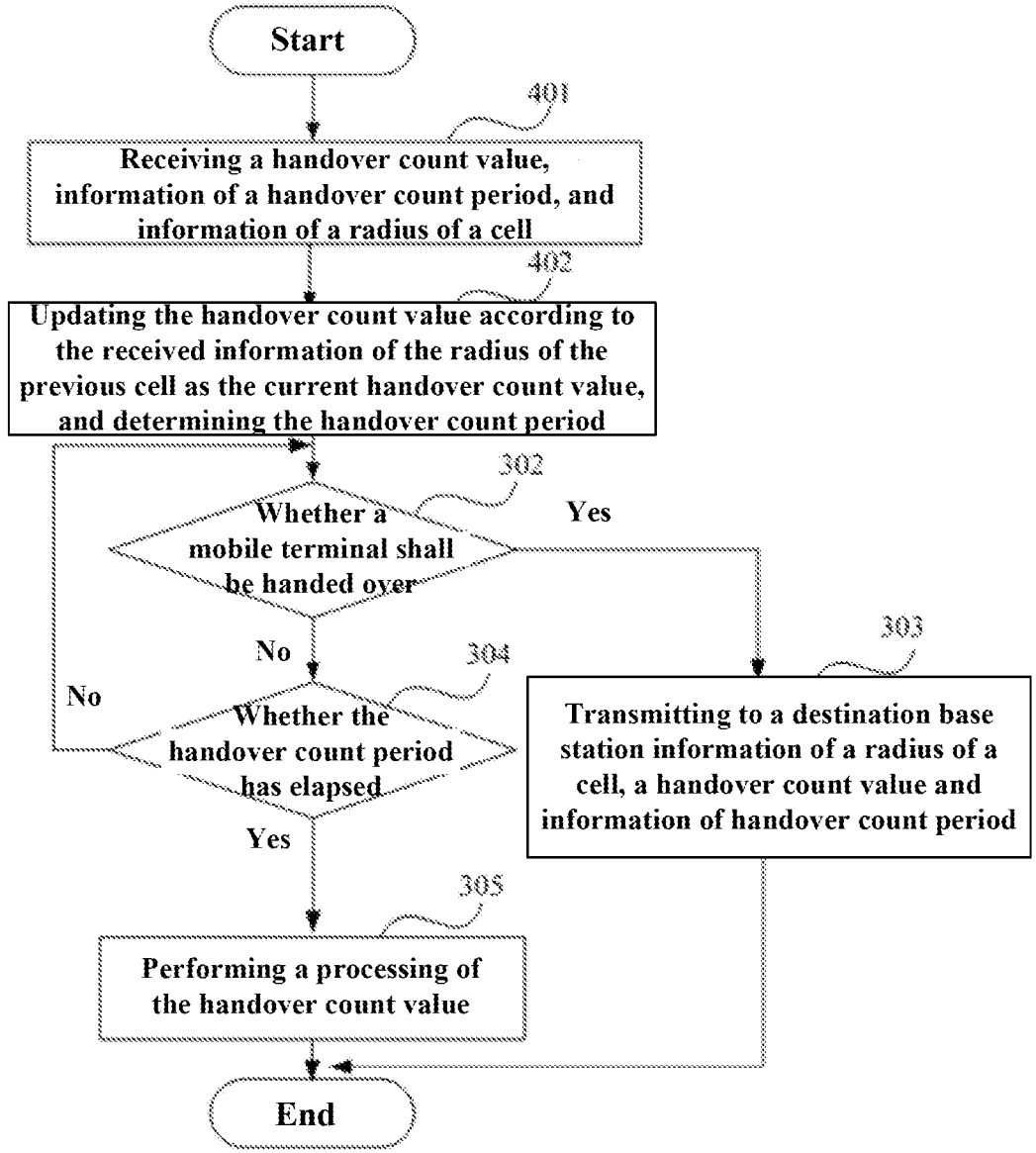
FIG. 4 illustrates a schematic flowchart of a method for determining a mobile state of the mobile terminal used in a base station serving as a handover destination of a mobile terminal according to an embodiment of the present invention.

FIG. 4 illustrates a schematic flowchart of a method implemented in a base station serving as a handover destination (i.e., a subsequent base station) of a mobile terminal and for determining a mobile state of the mobile terminal according to an embodiment of the present invention. The flowchart of FIG. 4 is refined based on the flowchart of FIG. 3, and it specifically illustrates the processing in the base station serving as the handover destination (i.e., the subsequent base station) of the mobile terminal.

As illustrated in FIG. 4, firstly in step 401, receiving from a base station (the previous base station) serving the mobile terminal before handover, information of a handover count period, a handover count value, and information of a radius of a cell where the previous base station is located. Next, in step 402, the current handover count value is determined according to the received handover count value and the radius of the cell where the previous base station is located. The above equation can be used to determine the current handover count value. In step 402, a handover count period of the present base station is further determined according to the received information of the handover count period. For example, if the received information of the handover count period is the count end time, it is easy to determine the handover count period of the present base station. In addition, the handover count period still can be expressed as the received count end time.

Steps 401 and 402 are refined based on step 301 in FIG. 3. Other steps are the same as those illustrated in FIG. 3, and herein are omitted.

When the ping-pong effect is considered, in step 401, not only receiving the information of the handover count period, the handover count value, and the radius of the cell where the previous base station is located from the base station (the previous base station) serving the mobile terminal before handover, but also receiving a list of r values of a predetermined number of cells most recently serving the mobile terminal after handover counting, or handover count values of a predetermined number of handovers before the present handover. Next, the base station judges whether a ping-pong effect occurs, and acquires the current handover count value according to the judgment result, such as the above mentioned method.

The processing based on the handover count value (i.e., the post-processing of the handover count value) may be performed in various methods known to a person skilled in the art at present or in future. Herein some preferred embodiments are briefly described.

Figure 5:
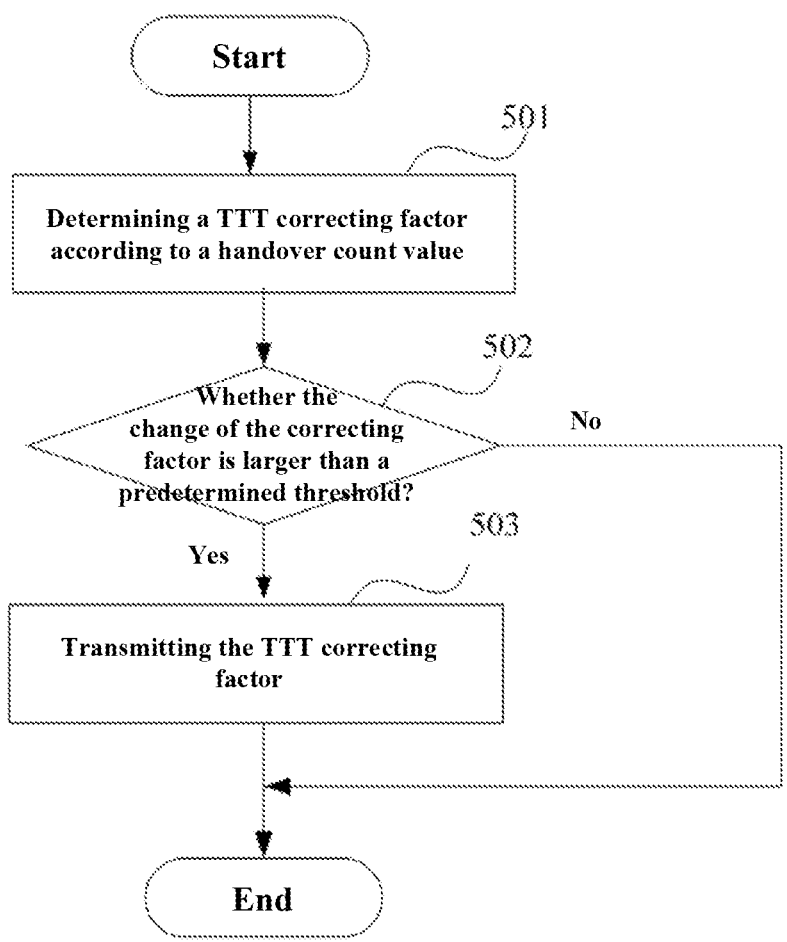
FIG. 5 illustrates an embodiment of a processing based on handover count value.

FIG. 5 illustrates an embodiment of a post-processing of a handover count value.

As illustrated in FIG. 5, firstly in step 501, determining a TTT correcting factor according to the handover count value, e.g., the TTT correcting factor may be determined in the following method.

Method 1 (search method): it is assumed that the handover count value is Num_h. The handover count value is compared with an upper threshold and a lower threshold stored by the base station. When the handover count value is larger than the upper threshold, it is deemed that the mobile terminal enters a high speed mobile state. When the handover count value is between the upper threshold and the lower threshold, it is deemed that the mobile terminal enters an intermediate speed mobile state. Next, the base station can obtain a TTT correcting factor corresponding to the mobile state based on a correspondence between the mobile state and the correcting factor stored at the network side. In one embodiment, when the handover count value is smaller than the lower threshold, it is deemed that the mobile terminal enters a normal mobile state. In another embodiment, when the handover count value is smaller than the lower threshold, the base station continues the handover counting until an additional handover count period expires. If the mobile terminal enters neither the high speed mobile state nor the low speed mobile state during the additional handover count period, it enters the normal mobile state. In that case, in one embodiment, the base station can determine the value of the additional handover count period according to an agreement by itself. In another embodiment, the value of the additional handover count period can be received from the previous base station. For example, in step 303 illustrated in FIG. 3, the previous base station may transmit the information of the additional handover count period to the subsequent base station serving as the handover destination. The information representing the additional handover count period (i.e., the information of the additional handover count period) may be additional count start time and a counting duration, or may be additional count end time. The additional handover count period is the duration of handover counting performed for detecting whether the mobile terminal enters the normal mobile state.

In this method, the correcting factors obtained for Num_h in a certain interval are the same.

The base station may adjust the upper threshold and the lower threshold according to the situation, so as to improve the system flexibility.

Method 2 (direct calculation method): the base station directly obtains the correcting factor from Num_h through a certain continuous function. For example, the correcting factor SF=f(Num_h). In this method, different correcting factors can be obtained for different Num_h. f(Num_h) is a function taking Num_h as an independent variable.

Next, in step 502, judging whether the change of the correcting factor is larger than a predetermined threshold. For example, when assuming that the correcting factor of unnecessary to change the TTT is 1, the TTT correcting factor calculated in step 501 is compared with 1. If the absolute value of a difference or ratio therebetween is smaller than a predetermined threshold, it is judged that the change of the correcting factor is not larger than the predetermined threshold, and the processing is ended. If the change of the correcting factor is larger than the predetermined threshold, the processing proceeds to step 503, and the TTT correcting factor calculated in step 501 is transmitted to the mobile terminal.

In another embodiment, if the change of the correcting factor is larger than the predetermined threshold, the processing proceeds to step 503, and the TTT correcting factor calculated in step 501 is transmitted to the mobile terminal. If the absolute value of the difference or ratio therebetween is smaller than the predetermined threshold, it is judged that the change of the correcting factor is not larger than the predetermined threshold, and the handover counting is continued until the additional handover count period expires. Then the TTT correcting factor is compared with 1 again, and the processing is ended if it is judged that the change of the correcting factor is still not larger than the predetermined threshold.

In an alternative embodiment, the correcting factor currently used by the mobile terminal may be compared with the correcting factor in step 501 (e.g., to get a difference or ratio therebetween). If the difference or ratio is larger than the predetermined threshold, the TTT correcting factor calculated in step 501 is transmitted to the mobile terminal, otherwise the processing is directly ended. The correcting factor currently used by the mobile terminal may be transmitted from the base station deciding to detect the mobile state of the mobile terminal.

Obviously, the judgment in step 502 may be omitted, and the TTT correcting factor calculated in step 501 is transmitted to the mobile terminal regardless of its value.

The base station may notify the TTT correcting factor to the mobile terminal through the downlink channel of the air interface.

In an alternative embodiment, the processing based on the handover count value in step 305 may directly transmit the handover count value to the mobile terminal, so that the mobile terminal determines the TTT correcting factor by itself in the above method.

In order to better describe the embodiments of the present invention, the present invention will be exemplarily described as follows in a case where the handover is performed twice during the handover count period.

Figure 6:
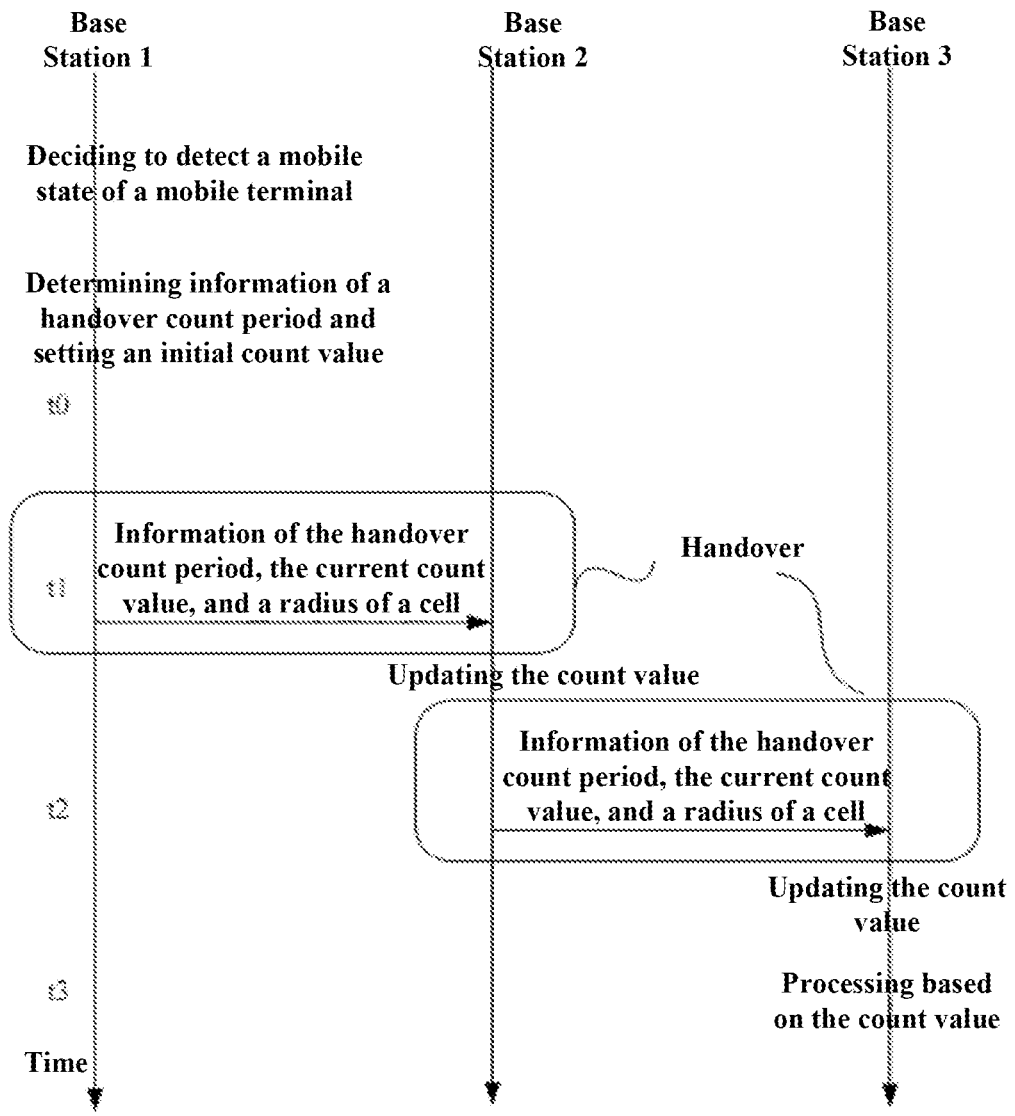
FIG. 6 illustrates operations of related base stations and information interactions between the base stations when the handover is performed twice during a handover count period according to an embodiment of the present invention.

FIG. 6 illustrates operations of related base stations and information interactions between the base stations when the handover is performed twice during a handover count period according to an embodiment of the present invention. It is assumed that a radius of a cell where a base station 2 is located is twice of a radius of a cell where a base station 1 is located.

As illustrated in FIG. 6, the base station 1 is an initial base station, which decides to detect a mobile state of a mobile terminal, determines information of a handover count period and a handover count initial value (assumed as 0), and counts at t0.

A handover is performed at t1. In that case, the base station 1 transmits the information of the handover count period, the current handover count value (i.e., the handover count initial value herein), and the information of the radius of the cell to the base station 2 serving as the handover destination. The base station 2 updates the count value according to the received current handover count value and the information of the radius of the cell where the base station 1 is located. It is assumed that a value 1 is obtained using Num_h(n)=Num_h(n−1)+r(n) according to the function r(n), thus the current handover count value is 1 at that time. The second handover is performed at t2. Similarly, the base station 2 transmits the information of the handover count period, the current handover count value (being 1 herein), and the information of the radius of the cell where the base station 2 is located to a base station 3 serving as the handover destination. The base station 3 updates the count value according to the received current handover count value and the information of the radius of the cell where the base station 2 is located. Since the radius of the base station 2 is larger than the radius of the base station 1, the value obtained according to the function r(n) is larger than 1 (assumed as 2), thus the current handover count value is 3 at that time.

As the counting expires at t3, the base station 3 performs a processing based on count value.

Figure 7:
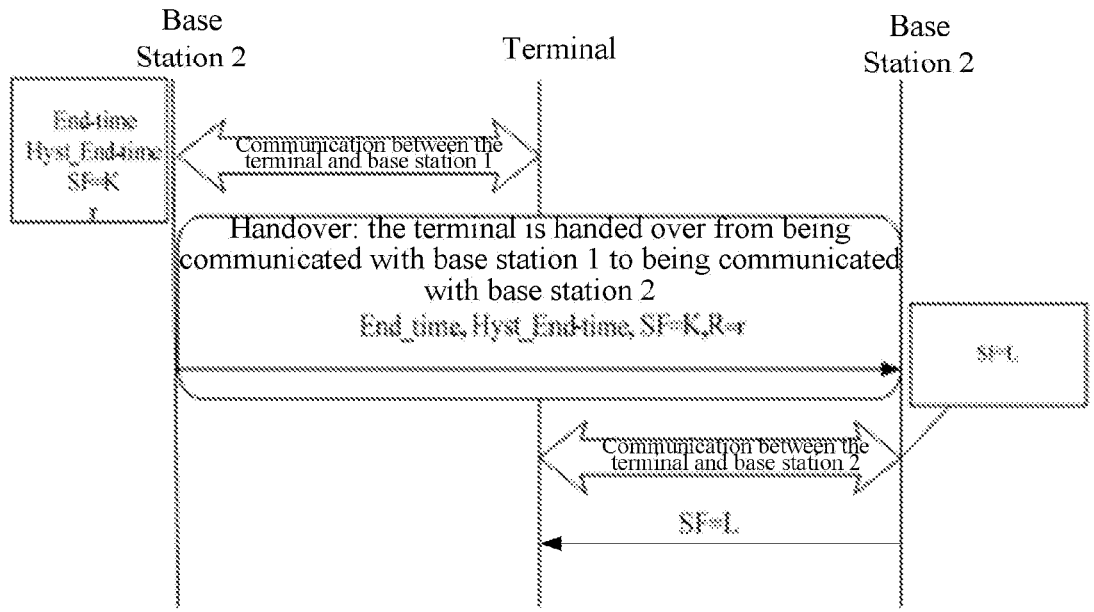
FIG. 7 illustrates operations of related base stations and information interactions between the base stations and between the base stations and a terminal when the handover is performed once in a handover count period according to another embodiment of the present invention.

FIG. 7 illustrates operations of related base stations and information interactions between the base stations when the handover is performed once during a handover count period according to another embodiment of the present invention. Corresponding mobile terminal is also illustrated in the drawing.

As illustrated in FIG. 7, the base station 1 determines an initial count value Num_h, additional count end time Hyst_End-time and count end time End_time, and acquires a TTT correcting factor SF (assumed as K) currently used by the mobile terminal. When a handover occurs, the base station 1 transmits Num_h, End_time, the additional count end time Hyst_End-time, radius information thereof r and the TTT correcting factor SF currently used by the mobile terminal to the base station 2. The base station 2 updates the count value according to Num_h and the radius information r of the base station 1, and updates the TTT correcting factor according to the count value obtained through counting, when the count end time arrives. Assuming that the obtained TTT correcting factor is L, and it is judged whether the difference or ratio between L and K is larger than a predetermined threshold. Assuming that under the situation illustrated in FIG. 7, the difference between L and K is larger than the predetermined threshold, the correcting factor is transmitted to the mobile terminal.

The ping-pong effect is not considered in the examples illustrated in FIGS. 6-7. But according to the descriptions of FIGS. 3-4 and the ping-pong effect, a person skilled in the art can determine the information interactions between the base stations when the ping-pong effect is considered, which are omitted herein.

The example illustrated in FIG. 6 also does not consider the additional handover count period when it is judged that the mobile terminal enters the normal mobile state. But according to the previous description of the additional handover count period, a person skilled in the art can determine how to set the additional handover count period, and how to perform a communication between the base stations during the additional handover count period.

According to the method of the present invention, the mobile state of the mobile terminal can be acquired more simply, without depending on a speed measuring capability of the mobile terminal, thereby obtaining the TTT correcting factor of the mobile terminal. Next, a processing of a mobile terminal according to an embodiment of the present invention will be described as follows.

Figure 8:
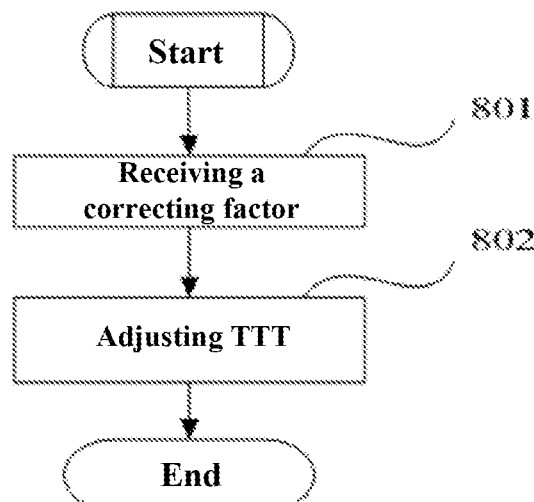
FIG. 8 illustrates a flowchart of a method for adjusting TTT of a mobile terminal according to an embodiment of the present invention.

FIG. 8 illustrates a flowchart of a method for adjusting TTT of a mobile terminal according to an embodiment of the present invention.

As illustrated in FIG. 8, firstly in step 801, a correcting factor is received from a base station. Next, in step 802, the TTT is adjusted according to the received TTT correcting factor.

Figure 9:
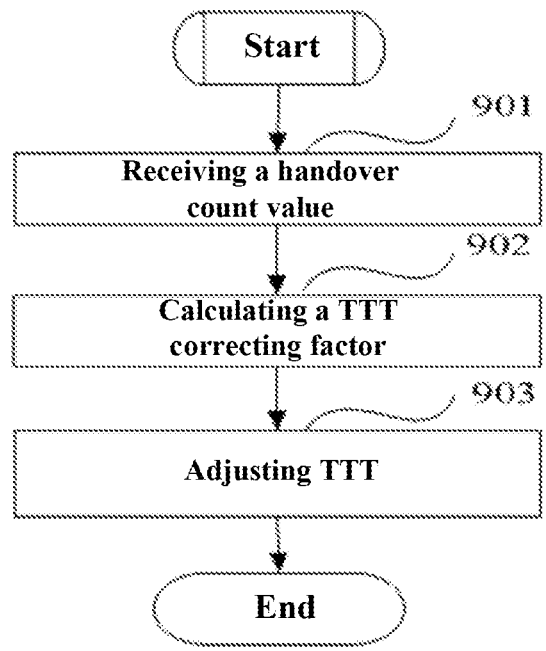
FIG. 9 illustrates a flowchart of a method for adjusting TTT of a mobile terminal according to another embodiment of the present invention.

FIG. 9 illustrates a flowchart of a method for adjusting TTT of a mobile terminal according to another embodiment of the present invention.

As illustrated in FIG. 9, firstly in step 901, a handover count value is received from a base station. Next, in step 902, a TTT correcting factor is determined according to the received handover count value. This can be done with reference to the description of the search method or the direct calculation method. Next, in step 903, the TTT is adjusted according to the calculated TTT correcting factor.

Figure 10:
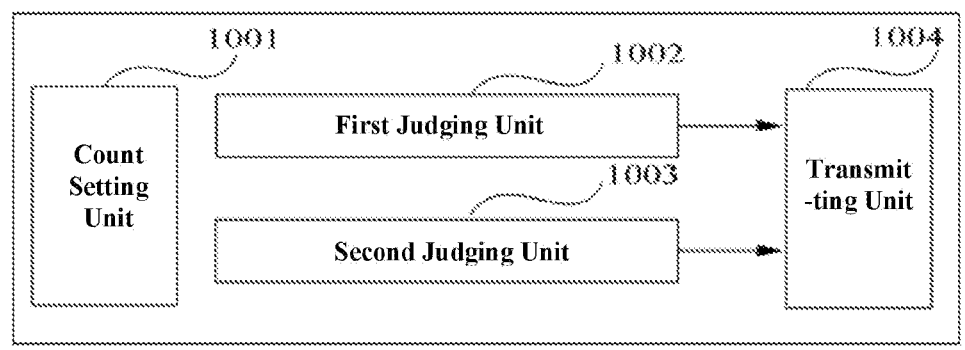
FIG. 10 illustrates a schematic block diagram of a base station according to an embodiment of the present invention.

FIG. 10 illustrates a schematic block diagram of a base station according to an embodiment of the present invention. As illustrated in FIG. 10, a base station according to an embodiment of the present invention includes a count setting unit 1001, a first judging unit 1002, a second judging unit 1003 and a transmitting unit 1004. The count setting unit 1001 is configured to set a handover count period and a current handover count value. The first judging unit 1002 (also referred to as handover count period judging unit) is configured to judge whether the handover count period has elapsed. The second judging unit 1003 (also referred to as handover judging unit) is configured to judge whether the mobile terminal is handed over. If the handover count period has not elapsed and the mobile terminal is handed over, the transmitting unit 1004 transmits information of the handover count period, the current handover count value and information of a radius of a cell where the base station is located to the base station serving as a handover destination cell.

In one embodiment, the count setting unit 1001 is further configured to set an additional handover count period for determining whether the mobile terminal enters the normal mobile state. The first judging unit 1002 is further configured to determine whether the additional handover count period has elapsed. The transmitting unit 1004 is further configured to transmit information of the additional handover count period to the base station serving as the handover destination cell.

Figure 11:
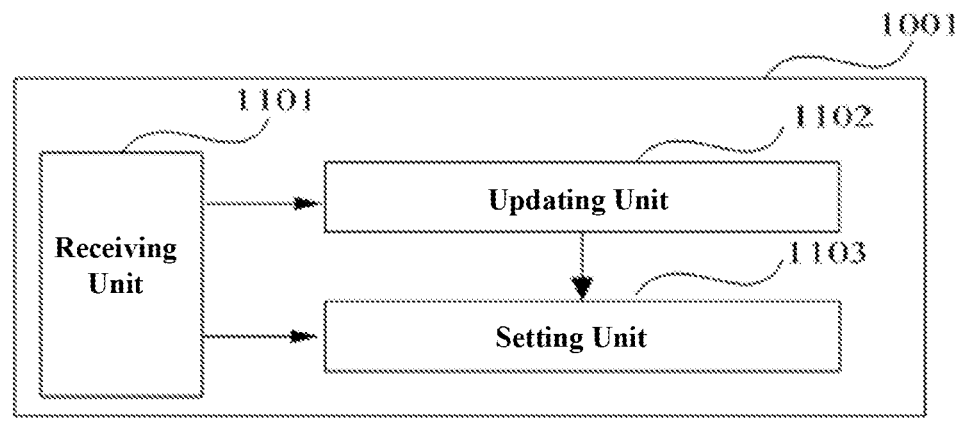
FIG. 11 illustrates a schematic block diagram of a count setting unit according to an embodiment of the present invention.

FIG. 11 illustrates a schematic block diagram of a count setting unit according to an embodiment of the present invention. As illustrated in FIG. 11, the count setting unit according to an embodiment of the present invention includes: a receiving unit 1101 configured to receive, from another base station (a serving base station before handover), information of a handover count period, a handover count value and information of a radius of a cell where the another base station is located; an updating unit 1102 configured to update the received handover count value according to the received information of the radius of the cell where the another base station is located, so as to obtain a current handover count value; and a setting unit 1103 configured to set the handover count period according to the received information of the handover count period, and set the updated handover count value as the current handover count value.

In one embodiment, the receiving unit 1101 is further configured to receive information of an additional handover count period. The setting unit 1103 is configured to set an additional handover count period according to the received information of the additional handover count period, and set the updated handover count value as the current handover count value. In that case, the setting unit 1103 for example includes an additional handover count period setting unit (not illustrated), or the setting unit 1103 realizing the function is referred to as an additional handover count period setting unit. That is, the base station includes the additional handover count period setting unit.

In one embodiment, the receiving unit 1101 is further configured to receive a list of r values of a predetermined number of cells most recently serving the mobile terminal after handover counting, or handover count values of a predetermined number of handovers before the present handover and after handover counting. The count setting unit further includes a ping-pong judging unit (not illustrated) which judges whether a ping-pong effect occurs. In addition, the updating unit 1102 obtains the current handover count value according to the judgment result, such as the above mentioned method.

Figure 12:
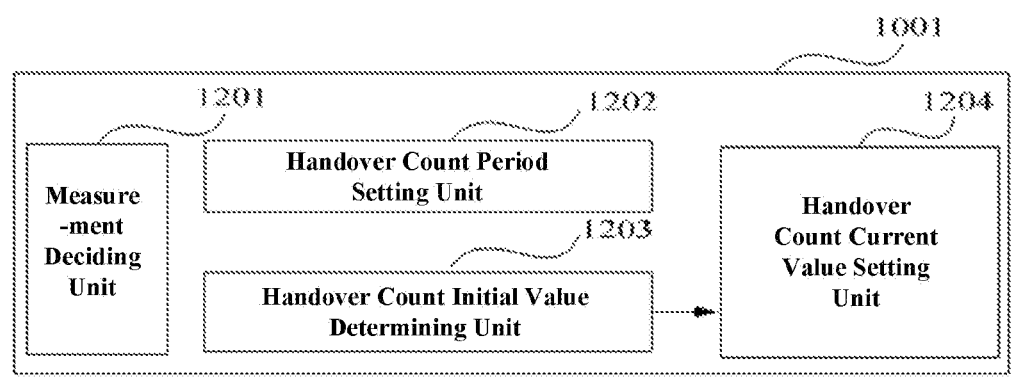
FIG. 12 illustrates a schematic block diagram of a count setting unit according to another embodiment of the present invention.

FIG. 12 illustrates a schematic block diagram of a count setting unit according to another embodiment of the present invention. As illustrated in FIG. 12, the count setting unit according to another embodiment of the present invention includes a measurement deciding unit 1201 configured to decide to detect a mobile state of a mobile terminal; a handover count period setting unit 1202 configured to determine and set the handover count period; a handover count initial value determining unit 1203 configured to determine an initial value of the handover count value; and a handover count current value setting unit 1204 configured to set the determined initial value of the handover count value as the current handover count value.

In one embodiment, the handover count period setting unit 1202 is further configured to determine and set an additional handover count period. In that case, the handover count period setting unit 1202 for example includes an additional handover count period setting unit (not illustrated), or the handover count period setting unit 1202 realizing the function is also referred to as an additional handover count period setting unit. That is, the base station includes the additional count period setting unit.

To be noted, in the communication system, under certain condition a particular base station may serve as the initial base station to decide to detect the mobile state of the mobile terminal, or serve as the subsequent base station (the base station serving as a handover destination). Thus the count setting units of the two embodiments illustrated in FIGS. 12 and 11 may occur in the same base station.

Figure 13:
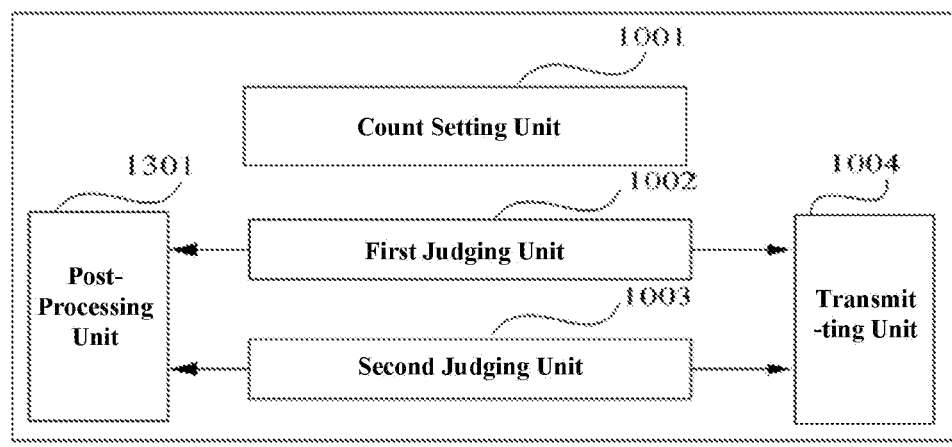
FIG. 13 illustrates a schematic block diagram of a base station according to an embodiment of the present invention.

FIG. 13 illustrates a schematic block diagram of a base station according to an embodiment of the present invention. As illustrated in FIG. 13, being compared with the base station of FIG. 10, the base station according to an embodiment of the present invention further includes a post-processing unit 1301 configured to perform various processing based on a handover count value, such as transmitting the handover count value to a mobile terminal, calculating a TTT correcting factor according to the handover count value, and transmitting the TTT correcting factor to the mobile terminal. In another embodiment, before transmitting the TTT correcting factor to the mobile terminal, the post-processing unit 1301 compares the determined correcting factor with the TTT correcting factor currently used by the mobile terminal, and if a difference or ratio therebetween is smaller than a predetermined threshold, the post-processing unit 1301 does not transmit the determined TTT correcting factor to the mobile terminal.

Figure 14:
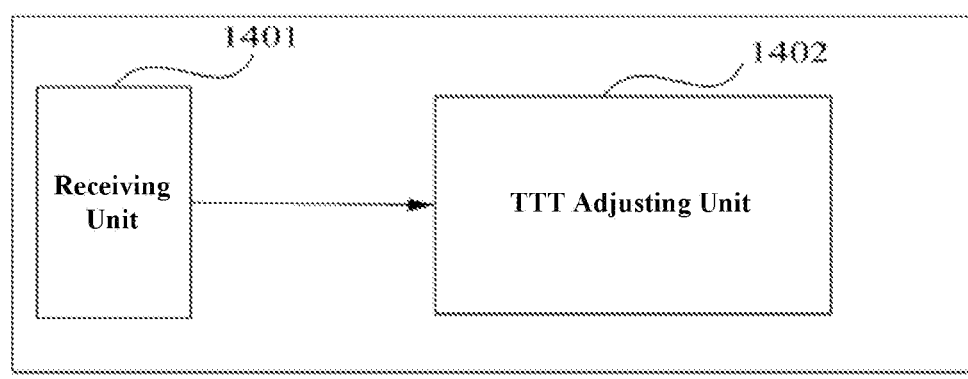
FIG. 14 illustrates a schematic block diagram of a mobile terminal according to an embodiment of the present invention.

FIG. 14 illustrates a schematic block diagram of a mobile terminal according to an embodiment of the present invention. As illustrated in FIG. 14, the mobile terminal includes a receiving unit 1401 configured to receive a TTT correcting factor; a TTT adjusting unit 1402 configured to adjust TTT according to the TTT correcting factor.

Figure 15:
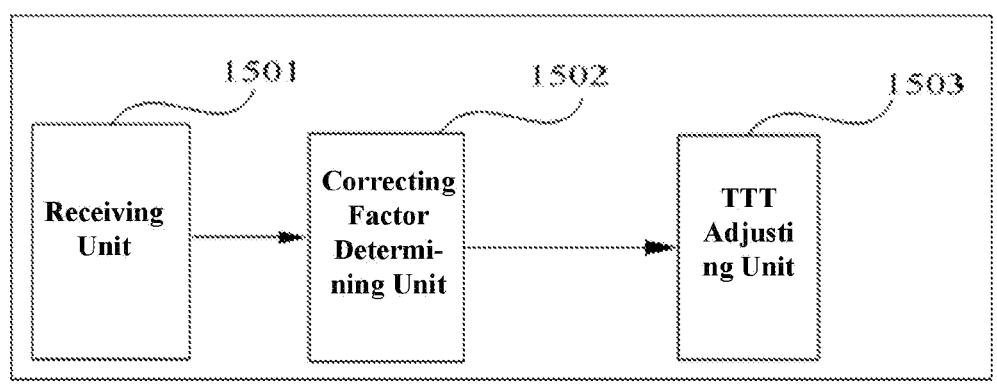
FIG. 15 illustrates a schematic block diagram of a mobile terminal according to another embodiment of the present invention.

FIG. 15 illustrates a schematic block diagram of a mobile terminal according to another embodiment of the present invention. As illustrated in FIG. 15, the mobile terminal includes a receiving unit 1501 configured to receive a handover count value; a correcting factor determining unit 1502 configured to determine a TTT correcting factor according to the handover count value; and a TTT adjusting unit 1503 configured to adjust TTT according to the determined TTT correcting factor.

The technical solutions of the present invention mainly have the following advantages: 1) without depending on a speed measuring capability of the mobile terminal or the handover counting of the mobile terminal, and the mobile terminal is simply implemented; 2) the network side can dynamically adjust the correcting factor by adjusting r(n) or f(Num_h) according to the cell size or other factors such as the number of the mobile terminals. A technical solution is not required to include the above advantages simultaneously.

Figure 16:
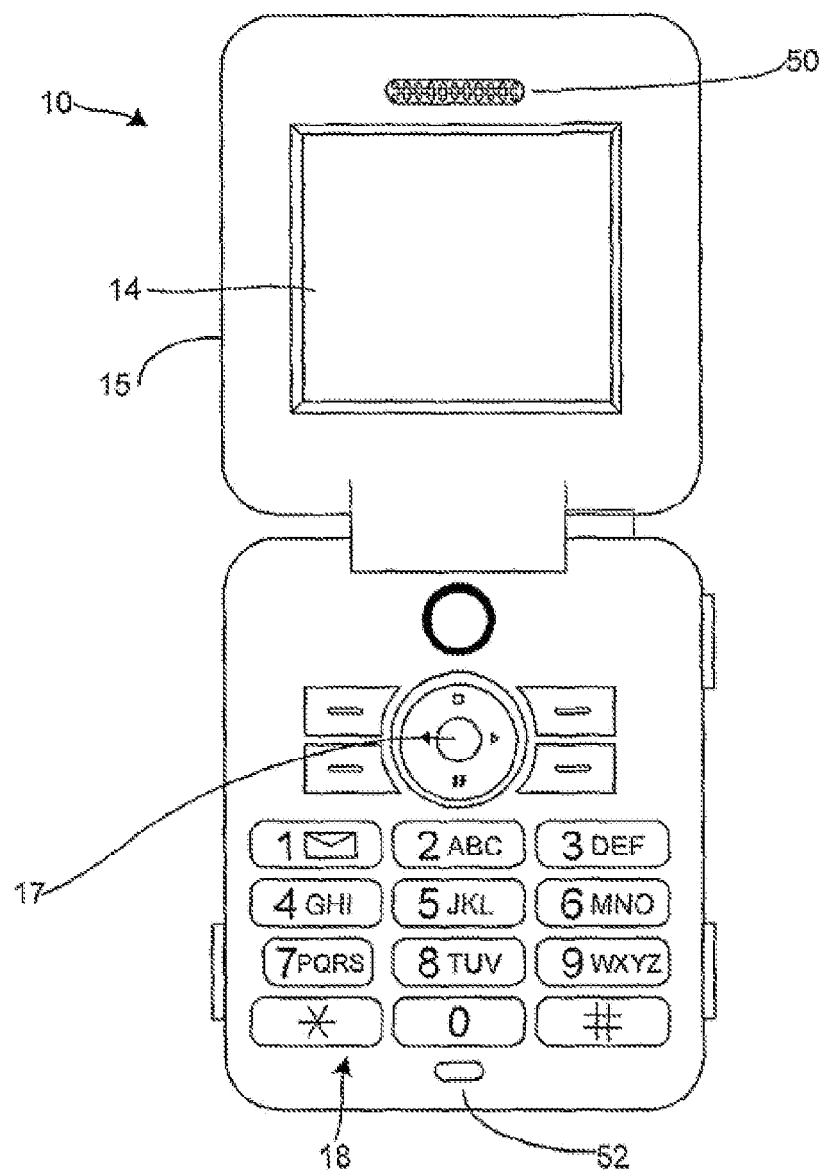
FIG. 16 illustrates a schematic diagram of a mobile phone used as an example of a mobile device (user terminal) according to an embodiment of the present invention.

FIG. 16 illustrates a schematic diagram of a mobile phone used as an example of a mobile device (user terminal) according to an embodiment of the present invention. As illustrated in FIG. 16, a mobile phone 10 may be a flip phone having a cover 15 movable between an open position and a closed position. In FIG. 16, the cover 15 is illustrated as being located at the open position. It shall be appreciated that the mobile phone 10 may be other structure such as a "bar phone" or a "slide phone".

The mobile phone 10 may include a display 14 that displays information such as operating state, time, telephone number, telephone directory, menus, etc. to the user, so that the user can utilize various features of the electronic device 10. The display 14 may be further configured to visually display the content received by the electronic device 10 and/or retrieved from a memory (not illustrated) of the mobile phone 10. The display 14 may be configured to present images, videos and other graphics (e.g., photos, mobile TV programs and game-related videos) to the user.

A keypad 18 provides multiple user input operations. For example, the keypad 18 may include alphanumeric keys that allow alphanumerical information (e.g., telephone number, telephone list, telephone directory, notepad, text, etc.) to be input. In addition, the keypad 18 may include specific function keys 17, such as a "call send" key for initiating or answering a phone call, and a "call end" key for ending or hanging up the phone call. The specific function keys may further include a menu navigation key and a selection key which conveniently perform navigation through menus displayed on the display 14. For example, a pointing device and/or a navigation key may be provided to receive a directional input from the user. In addition, the display 14 and the keypad 18 may be used in combination to realize the soft key function. The mobile phone 10 further includes parts essential for realizing its functions, such as an antenna, a microcontroller, a speaker 50 and a microphone 52.

In the descriptions of the embodiments of the present invention, descriptions of the methods and steps may be taken to help the understanding of the devices and units, and descriptions of the devices and units may be taken to help the understanding of the method and steps.

The above devices, units, methods and steps of the present invention may be implemented by hardware, or a combination of hardware and software. The present invention relates to a logic part readable program which when being executed by a logic part, enables the logic part to implement the aforementioned device or constituent parts, or enables the logic part to implement the aforementioned methods or steps. The logic part for example may be a field programmable logic part, a microprocessor, a processor used in the computer, etc. The present invention further relates to a storage medium for storing the above program, such as hard disc, magnetic disc, optical disc, DVD, flash, magnetic optical disc, memory card, memory stick, etc.

Herein, features described and/or illustrated with respect to one embodiment can be used in one or more other embodiments in a same or similar way, and/or used by being combined with or replacing the features of other embodiments.

The present invention is described as above in conjunction with the specific embodiments. But a person skilled in the art shall appreciate that those descriptions are just exemplary, rather than limitations to the protection scope of the present invention. A person skilled in the art can make various modifications and changes to the present invention based on the spirit and the principle of the present invention, and those modifications and changes also fall within the scope of the present invention.

What is claimed is:

1. A method for determining a mobile state of a mobile terminal, applied in a base station, comprising:
   setting a handover count period and a current handover count value;
   determining whether the handover count period has elapsed;
   determining whether the mobile terminal is handed over; and
   transmitting information of the handover count period, the current handover count value and information of a size of a cell where the base station is located to a base station serving as a handover destination cell, in case the handover count period has not elapsed and the mobile terminal is handed over,
   wherein, the setting the handover count period and the current handover count value comprises:

receiving, from the base station before handover, information of the handover count period, a handover count value and information of a size of a cell where the base station before handover is located, and a list of sizes of a predetermined number of cells most recently serving the mobile terminal after handover counting, or handover count values of a predetermined number of handover before the handover this time.

2. The method according to claim 1, wherein the mobile terminal is handed over to the base station, and the setting the handover count period and the current handover count value comprises:
   judging whether the mobile terminal is subsequently handed over back to one cell after being handed over out of the one cell;
   updating the received handover count value according to the received information of the size of the cell where the base station before handover is located, in case the mobile terminal is not subsequently handed over back to one cell after being handed over out of the one cell;
   updating the received handover count value according to the received list of sizes of a predetermined number of cells most recently serving the mobile terminal after handover counting, or handover count values of a predetermined number of handover before the handover this time, in case the mobile terminal is subsequently handed over back to one cell after being handed over out of the one cell; and
   setting the handover count period according to the received information of the handover count period, and setting the updated handover count value as the current handover count value.

3. The method according to claim 1, further comprising setting an additional count period for judging whether the mobile terminal is in a normal mobile state after the handover count period expires.

4. The method according to claim 1, further comprising:
   performing a processing based on the current handover count value in case the handover count period has elapsed.

5. The method according to claim 4, wherein the processing based on the current handover count value is to transmit the handover count value to the mobile terminal.

6. The method according to claim 4, wherein the processing based on the current handover count value comprises:
   determining a Time to Trigger (TTT) correcting factor according to the handover count value; and
   transmitting the determined TTT correcting factor to the mobile terminal.

7. The method according to claim 4, further comprising receiving, from another base station, a TTT correcting factor currently used by the mobile terminal,
   wherein the processing based on the current handover count value comprises:
   determining a TTT correcting factor according to the handover count value;
   judging whether a difference or ratio between the determined TTT correcting factor and the TTT correcting factor currently used by the mobile terminal is larger than a predetermined value;
   transmitting the determined TTT correcting factor to the mobile terminal in case the difference or ratio is larger than the predetermined value.

8. A base station, comprising:
   a memory that stores a plurality of instructions; and
   a processor coupled to the memory and configured to execute the instructions to:
   set a handover count period and a current handover count value;
   determine whether the handover count period has elapsed;
   determine whether a mobile terminal is handed over; and
   transmit information of the handover count period, the current handover count value and information of a size of a cell where the base station is located to a base station serving as a handover destination cell, in case the handover count period has not elapsed and the mobile terminal is handed over,
   wherein the processor further executes the instructions to:
   receive, from the base station before handover, information of the handover count period, a handover count value and the information of the size of the cell where another base station is located, and a list of sizes of a predetermined number of cells most recently serving the mobile terminal after handover counting, or handover count values of a predetermined number of handover before the handover this time.

9. The base station according to claim 8, wherein the mobile terminal is handed over to the base station, and the processor further executes the instructions to:
   judge whether the mobile terminal is subsequently handed over back to one cell after being handed over out of the one cell;
   update the received handover count value according to the received information of the size of the cell where the base station before handover is located, in case the processor judges that the mobile terminal is not subsequently handed over back to one cell after being handed over out of the one cell; and update the received handover count value according to the received list of sizes of a predetermined number of cells most recently serving the mobile terminal after handover counting, or handover count values of a predetermined number of handover before the handover this time, in case the processor judges that the mobile terminal is subsequently handed over back to one cell after being handed over out of the one cell; and
   set the handover count period according to the received information of the handover count period, and set the updated handover count value as the current handover count value.

10. The base station according to claim 8, wherein the processor further executes the instructions to: set an additional count period for judging whether the mobile terminal is in a normal mobile state after the handover count period expires, and
    transmit the additional count period to a base station serving as a handover destination cell, in case the handover count period has not elapsed and the mobile terminal is handed over.

11. The base station according to claim 8, wherein the processor further executes the instructions:
    to perform a processing based on the current handover count value in case the handover count period has elapsed.

12. A method for determining a mobile state of a mobile terminal, applied in a base station, comprising:
    setting a handover count period and a current handover count value;
    determining whether the handover count period has elapsed;
    determining whether the mobile terminal is handed over; and
    transmitting information of the handover count period, the current handover count value and information of a size of a cell where the base station is located to a base station serving as a handover destination cell, in case the handover count period has not elapsed and the mobile terminal is handed over, wherein, the setting the handover count period and the current handover count value comprises:

receiving, from the base station before handover, information of the handover count period, a handover count value and information of a size of a cell where the base station before handover is located;

updating the received handover count value according to the received information of the size of the cell where the base station before handover is located, in case the mobile terminal is not subsequently handed over back to one cell after being handed over out of the one cell; and setting the handover count period according to the received information of the handover count period, and setting the updated handover count value as the current handover count value.

13. A method for determining a mobile state of a mobile terminal, applied in a base station, comprising:

setting a handover count period and a current handover count value;

determining whether the handover count period has elapsed;

determining whether the mobile terminal is handed over; and transmitting information of the handover count period, the current handover count value and information of a size of a cell where the base station is located to a base station serving as a handover destination cell, in case the handover count period has not elapsed and the mobile terminal is handed over, wherein, the setting the handover count period and the current handover count value comprises:

receiving, from the base station before handover, information of the handover count period, a handover count value, and a list of sizes of a predetermined number of cells most recently serving the mobile terminal after handover counting, or handover count values of a predetermined number of handover before the handover this time;

updating the received handover count value according to the received list of sizes of a predetermined number of cells most recently serving the mobile terminal after handover counting, or handover count values of a predetermined number of handover before the handover this time, in case the mobile terminal is subsequently handed over back to one cell after being handed over out of the one cell; and setting the handover count period according to the received information of the handover count period, and setting the updated handover count value as the current handover count value.

14. A base station, comprising:
a memory that stores a plurality of instructions; and
a processor coupled to the memory and configured to execute the instructions to:

set a handover count period and a current handover count value;

determine whether the handover count period has elapsed;

determine whether a mobile terminal is handed over; and transmit information of the handover count period, the current handover count value and information of a size of a cell where the base station is located to a base station serving as a handover destination cell, in case the handover count period has not elapsed and the mobile terminal is handed over, wherein the processor further executes the instructions to:
receive from the base station before handover, information of the handover count period, a handover count value and information of a size of a cell where the base station before handover is located;

update the received handover count value according to the received information of the size of the cell where the base station before handover is located, in case the mobile terminal is not subsequently handed over back to one cell after being handed over out of the one cell; and set the handover count period according to the received information of the handover count period, and setting the updated handover count value as the current handover count value.

15. A base station, comprising:
a memory that stores a plurality of instructions; and
a processor coupled to the memory and configured to execute the instructions to:

set a handover count period and a current handover count value;

determine whether the handover count period has elapsed;

determine whether a mobile terminal is handed over; and transmit information of the handover count period, the current handover count value and information of a size of a cell where the base station is located to a base station serving as a handover destination cell, in case the handover count period has not elapsed and the mobile terminal is handed over, wherein the processor further executes the instructions to:
receive from the base station before handover, information of the handover count period, a handover count value, and a list of sizes of a predetermined number of cells most recently serving the mobile terminal after handover counting, or handover count values of a predetermined number of handover before the handover this time;

update the received handover count value according to the received list of sizes of a predetermined number of cells most recently serving the mobile terminal after handover counting, or handover count values of a predetermined number of handover before the handover this time, in case the mobile terminal is subsequently handed over back to one cell after being handed over out of the one cell; and set the handover count period according to the received information of the handover count period, and setting the updated handover count value as the current handover count value.

* * * * *